United States Patent
Diao (10) Patent No.: US 10,374,502 B2
(45) Date of Patent: Aug. 6, 2019

(54) PERMANENT MAGNET SPEED GOVERNOR HAVING FIXED MAGNETIC GAP

(71) Applicant: Junqi Diao, Jinan (CN)

(72) Inventor: Junqi Diao, Jinan (CN)

(*) Notice: Subject to any disclaimer, the term of this patent is extended or adjusted under 35 U.S.C. 154(b) by 296 days.

(21) Appl. No.: 15/533,321

(22) PCT Filed: Jan. 15, 2015

(86) PCT No.: PCT/CN2015/070752
§ 371 (c)(1),
(2) Date: Jun. 5, 2017

(87) PCT Pub. No.: WO2016/086515
PCT Pub. Date: Jun. 9, 2016

(65) Prior Publication Data
US 2017/0346382 A1    Nov. 30, 2017

(30) Foreign Application Priority Data

Dec. 5, 2014 (CN) .......................... 2014 1 0730913

(51) Int. Cl.
*H02K 1/27* (2006.01)
*H02K 49/10* (2006.01)
(Continued)

(52) U.S. Cl.
CPC ......... *H02K 49/104* (2013.01); *H02K 1/2753* (2013.01); *H02K 1/2786* (2013.01);
(Continued)

(58) Field of Classification Search
CPC .. H02K 49/104; H02K 1/2753; H02K 49/106; H02K 49/102; H02K 51/00
See application file for complete search history.

(56) References Cited

U.S. PATENT DOCUMENTS 2,432,234 A * 12/1947 Girard ..................... B01J 27/06
310/103
2,437,871 A * 3/1948 Wood .................. H02K 49/106
192/21.5

(Continued)

FOREIGN PATENT DOCUMENTS

| CN | 102916560 A | 2/2013 |
| CN | 203775006 U | 8/2014 |

(Continued)

OTHER PUBLICATIONS

Jul. 9, 2015 Search Report issued in International Patent Application No. PCT/CN2015/070752.

*Primary Examiner* — Robert W Horn
(74) *Attorney, Agent, or Firm* — Oliff PLC (57) ABSTRACT

A permanent magnet speed governor having a fixed magnetic gap. The permanent magnet speed governor has an outer magnetic rotor connected to a drive shaft and an inner magnetic rotor connected to a driven shaft, at least one outer permanent magnet being evenly distributed along the circumferential direction of the inner circumferential surface of the outer magnetic rotor, at least one inner permanent magnet being evenly distributed along the circumferential direction of the outer circumferential surface of the inner magnetic rotor, two magnetic pole sides of the inner permanent magnet being respectively fixed to an iron yoke, another two sides each being provided with a magnetically conductive body, one end of the inner magnetic rotor being provided with a magnetic circuit regulator used for moving each magnetically conductive body along the axial direction. Adoption of the fixed magnetic gap structure reduces the difficulty of assembly.

9 Claims, 8 Drawing Sheets

(51) Int. Cl.
*H02K 51/00* (2006.01)
*H02K 1/28* (2006.01)

(52) U.S. Cl.
CPC ............. *H02K 1/28* (2013.01); *H02K 49/102* (2013.01); *H02K 51/00* (2013.01); *H02K 2213/09* (2013.01)

(56) References Cited

U.S. PATENT DOCUMENTS

| | | | | |
|---|---|---|---|---|
| 3,354,833 A * | 11/1967 | Laing | .................... | F16C 25/045 310/104 |
| 3,411,450 A * | 11/1968 | Clifton | .................. | F04D 13/024 310/104 |
| 4,237,703 A * | 12/1980 | Wahl, Jr. | .................... | F16D 3/02 310/103 |
| 4,612,469 A * | 9/1986 | Muramatsu | .......... | H02K 49/046 310/105 |
| 4,678,409 A * | 7/1987 | Kurokawa | ............ | F04D 13/024 417/420 |
| 4,836,826 A * | 6/1989 | Carter | .................. | H02K 49/106 366/274 |
| 5,158,279 A * | 10/1992 | Laffey | .................. | B65H 3/5261 192/110 R |
| 5,292,284 A * | 3/1994 | Denk | ................... | H02K 49/106 310/104 |
| 5,708,313 A * | 1/1998 | Bowes | ................ | H02K 49/106 310/63 |
| 6,041,571 A * | 3/2000 | Fields | ................... | B65B 7/2835 310/103 |
| 6,234,938 B1 * | 5/2001 | Chen | ................ | A63B 21/00192 188/161 |
| 6,841,909 B2 * | 1/2005 | Six | .......... | H02P 15/02 310/103 |
| 6,841,910 B2 * | 1/2005 | Gery | .................... | H02K 49/106 310/103 |
| 7,741,746 B2 * | 6/2010 | Groening | ............ | H02K 49/106 310/106 |
| 9,178,405 B2 * | 11/2015 | Flanigan | ............ | H02K 49/106 |
| 9,438,095 B2 * | 9/2016 | Chen | ..................... | H02K 7/116 |
| 9,755,495 B2 * | 9/2017 | Bachmaier | ............ | H02K 49/10 |
| 9,835,222 B2 * | 12/2017 | Berg | ....................... | F04B 17/04 |
| 9,841,025 B2 * | 12/2017 | Mischiatti | .......... | F04D 13/0626 |
| 10,050,510 B2 * | 8/2018 | Ohhashi | ............... | F16H 49/00 |
| 10,263,503 B2 * | 4/2019 | Diao | ........... | H02K 49/043 |
| 2016/0028299 A1 * | 1/2016 | Mostovoy | ........... | H02K 49/106 310/78 |
| 2017/0271971 A1 * | 9/2017 | Riemay | ................ | H02K 49/102 |
| 2017/0310200 A1 * | 10/2017 | Diao | .................. | H02K 51/00 |
| 2017/0317573 A1 * | 11/2017 | Mueller | ................ | H02K 49/106 |
| 2017/0346382 A1 * | 11/2017 | Diao | .................. | H02K 51/00 |
| 2018/0013372 A1 * | 1/2018 | Diao | .................. | H02K 49/102 |
| 2018/0278139 A1 * | 9/2018 | Kimoto | .................. | F16H 49/00 |

FOREIGN PATENT DOCUMENTS

| | | |
|---|---|---|
| CN | 204205912 U | 3/2015 |
| DE | 102006004537 A1 | 8/2007 |

* cited by examiner

PERMANENT MAGNET SPEED GOVERNOR HAVING FIXED MAGNETIC GAP

TECHNICAL FIELD

The invention relates to a permanent magnet speed governor, specifically a permanent magnet speed governor having fixed magnetic gap.

BACKGROUND TECHNOLOGY

Permanent magnet speed governors realize speed regulation through the magnetic coupling of permanent magnet and realize the flexible (magnetic) connection of motors and loads, without any harmonic waves affecting power grid, with high reliability, and they can work in various severe environments such as high temperature, low temperature, humid environment, dirty environment, inflammable and explosive environment, unsteady voltage and thunder, greatly reducing mechanical vibration; they are widely used in power, iron and steel, metallurgy, petrochemical, paper-making, municipal engineering, ship, irrigation and mining industries. However, the existing commonly-used permanent magnet speed governors realize speed regulation through the adjustment of air gap, and the power consumption of magnetic circuit regulator is large, and there are shortcomings such as poor torque transmission capability, high difficulty in assembling and a waste of lots of rare earth resources. Besides, when the conductor rotor rotates, it has a relative movement with the permanent magnetic rotor, while the permanent magnetic field will produce an eddy in the conductor rotor, and lots of heat will produce consequently, because there must have a slip between the conductor rotor and the permanent magnetic rotor, with the speed adjustable range of 0-98%.

CONTENT OF INVENTION

As for the aforesaid problems, the present invention provides a permanent magnet speed governor having a fixed magnetic gap which can reduce the power consumption of magnetic circuit regulator, improve the torque transmission capability, reduces the difficulty in assembling, save rare earth resources, reduces production of heat and increases the range of speed regulation.

The existing permanent magnet speed governors controls the degree that the conductor rotor cuts the magnetic line of force and thus realize the adjustment of torque through changes in the air gap between the conductor rotor and permanent magnetic rotor, and that method has many shortcomings. Based on the principle of like poles repelling and opposite poles attracting, the present invention designs a new permanent magnet speed governor from the perspective of changing the forces between the outer magnetic rotor and the inner magnetic rotor, so as to achieve the purpose of changing the torque.

In order to solve the aforesaid problems, the present invention adopts the following technical solutions: a permanent magnet speed governor having fixed magnetic gap, comprising an outer magnetic rotor connected to a drive shaft and an inner magnetic rotor connected to a driven shaft, at least one outer permanent magnet being evenly distributed along the circumferential direction of the inner circumferential surface of the said outer magnetic rotor, and the end face of magnet of each outer permanent magnet is perpendicular to the end face of the outer magnetic rotor; at least one inner permanent magnet being evenly distributed along the circumferential direction of the outer circumferential surface of the said inner magnetic rotor, and the end face of magnet of each inner permanent magnet is perpendicular to the end face of inner magnetic rotor, two magnetic pole sides of the inner permanent magnet being respectively fixed to an iron yoke, another two sides each being provided with a magnetically conductive body, the magnetically conductive body is placed in the middle of two iron yokes, used for constituting a closed magnetic circuit surrounding the inner permanent magnet through matching with iron yoke, one end of the inner magnetic rotor being provided with a magnetic circuit regulator used for moving each magnetically conductive body along the axial direction. The magnetic circuit regulator changes the distance between the magnetically conductive body and the inner permanent magnet by controlling the movement of the magnetically conductive body, regulates the magnetic resistance to change the magnetism of the inner permanent magnet externally displayed and changes the acting force between the inner permanent magnet and the outer permanent magnet. The movable travel of magnetically conductive body is not smaller than the length of iron yoke. The specific adjustment process is as follows: the magnetically conductive body is moved by the magnetic circuit regulator to a position where it can form a closed magnetic circuit with the iron yoke, and when the inner permanent magnet is surrounded, the magnetic line smoothly passes through via magnetically conductive body, and the inner is short-circuited, while the inner magnetic rotor does not show magnetism externally; when the the magnetic circuit regulator controls the magnetically conductive body to move out completely from the gap between two iron yokes, the iron yoke can be magnetized to a strong magnet of the corresponding polarity; when the magnetically conductive body completely moves out from the iron yoke of inner rotor, the magnetic force of the inner permanent magnet will be externally displayed completely, and the inner magnetic rotor will display the maximum magnetic force externally; the moving-out process of the magnetically conductive body is the process that the inner magnetic rotor changes from no magnetic force to the maximum magnetic force; the change in the interaction force between the inner magnetic rotor and the outer magnetic rotor realizes the change in transmission force, and realize the speed adjustment process consequently. The number of outer permanent magnets can be the same as or different from the number of inner permanent magnets, and both are increased or decreased in pairs on the basis of pole (Pole N or Pole S magnet). Generally, the drive shaft is connected to the main motor, while the driven shaft is connected to the load, but both can be exchanged. That is, the drive shaft can be connected to the load, while the driven shaft can be connected to the main motor.

When the number of inner permanent magnets of inner magnetic rotor is the same as the number of outer permanent magnets of outer magnetic rotor, the 0~100% speed adjustment function of input and output revolution speed can be realized; when the number of inner permanent magnets of inner magnetic rotor is not equal to the number of outer permanent magnets of outer magnetic rotor, the 0~N % speed adjustment function of input and output revolution speed can be realized (the torque can change along with N in inverse proportion, but the maximum power does not change).

In comparison with the change in the axial distance of the conductor rotor and the permanent magnet rotor, this method reduces the power consumption of magnetic circuit regulator and improves the torque transmission capability.

There are many installation directions for the inner and outer permanent magnets, as long as they can ensure that the acting force between the inner permanent magnet and the outer permanent magnet is adjustable; the magnetic poles of the said outer permanent magnet and the inner permanent magnet are arranged along the radial direction, and the magnetisms of exposed magnetic pole surfaces of two adjacent outer permanent magnets or two adjacent inner permanent magnets being different;

Both are distributed in a circumferential way along the driven shaft

Another preferred installation method of the inner and outer permanent magnet is as follows: the magnetic poles of the said outer permanent magnet and the inner permanent magnet are arranged along the circumferential direction, and the magnetisms of exposed magnetic pole surfaces of neighboring sides of two adjacent outer permanent magnets or two adjacent inner permanent magnets being different. Both are circumferentially arranged around the driven shaft.

The said magnetic circuit regulator comprises a regulating actuator used for receiving control signals to control the movement of magnetically conductive body.

The said regulating actuator can be electric actuator, pneumatic actuator or hydraulic actuator. During the use process, the permanent magnet speed governor is installed in a certain control system, and the pressure, flow, liquid level or other control signals are received and processed by the control system and are provided to the regulating actuator, and the regulating actuator rotates the movable magnetizers through its actuator, and thus changes the intensity of magnetic reluctance.

Due to adopting fixed magnetic gap structure, the present invention greatly improves the meshing area of speed governor and reduces the assembly difficulty, reduces the heat generation, increases the speed governing range, saves the rare earth materials, greatly improves the torque transmission capacity. Since the principle of magnetic transmission is adopted, the speed control function of input and output speed of 0~N % can be realized, the application scope and the magnetic field of the present invention is greatly expanded; since it adopts the magnetic circuit adjustment structure, the power consumption of a mechanism for executing adjustment is greatly reduced and the entire volume of the speed governor is reduced to the maximum extent, not only lowering consumption of materials and saving installation space, but convenience is brought to the site installation construction at the same time.

Wherein, 1. Inner magnetic rotor, 2. Iron yoke, 3. Inner permanent magnet, 4. Driven shaft, 5. Drive shaft, 6. Outer magnetic rotor, 7. Outer permanent magnet, 8. Magnetically conductive body, 9. Regulating actuator.

Specific Embodiments

Embodiment 1

A permanent magnet speed governor having fixed magnetic gap, comprising an outer magnetic rotor 6 connected to a drive shaft 5 and an inner magnetic rotor 1 connected to a driven shaft 4, multiple outer permanent magnets 7 being evenly distributed along the circumferential direction of the inner circumferential surface of the said outer magnetic rotor 6, and the end face of magnet of each outer permanent magnet 7 is perpendicular to the end face of the outer magnetic rotor 6; at least one inner permanent magnet 3 being evenly distributed along the circumferential direction of the outer circumferential surface of the said inner magnetic rotor 1, and the end face of magnet of each inner permanent magnet 3 is perpendicular to the end face of inner magnetic rotor 1, in the present embodiment, the number of outer permanent magnets 7 is the same as the number of inner magnetic magnets 3, being eight, and the outer permanent magnet 7 and the inner permanent magnet 3 consist of a group of Pole N and Pole S magnets. the magnetic poles of the said outer permanent magnet 7 and the inner permanent magnet 3 are arranged along the radial direction, and the magnetisms of exposed magnetic pole surfaces of two adjacent outer permanent magnets 7 or two adjacent inner permanent magnets 3 being different. Two magnetic pole sides of the inner permanent magnet 3 being respectively fixed to an iron yoke 2, another two sides each being provided with a magnetically conductive body 8, the magnetically conductive body 8 is placed in the middle of two iron yokes 2, used for constituting a closed magnetic circuit surrounding the inner permanent magnet 3 through matching with iron yoke 2, one end of the inner magnetic rotor 1 being provided with a magnetic circuit regulator used for moving each magnetically conductive body 8 along the axial direction.

Embodiment 2

A permanent magnet speed governor having a fixed magnetic gap, wherein the magnetic poles of the said outer permanent magnet 7 and the inner permanent magnet 3 are arranged along the circumferential direction, and the magnetisms of exposed magnetic pole surfaces of neighboring sides of two adjacent outer permanent magnets 7 or two adjacent inner permanent magnets 3 being different, while other structures are the same as those of Embodiment 1.

Embodiment 3

Figure 1:
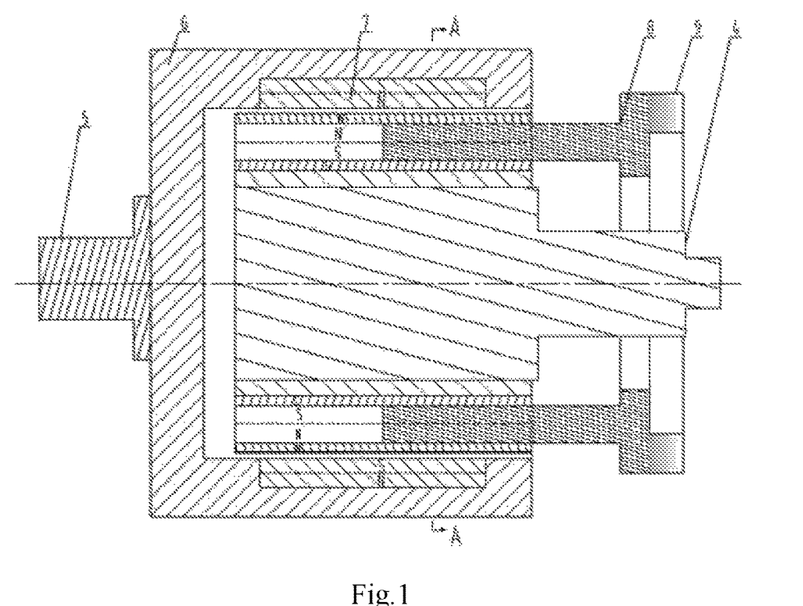
FIG. 1 is the front section view of Embodiment 1.
Figure 2:
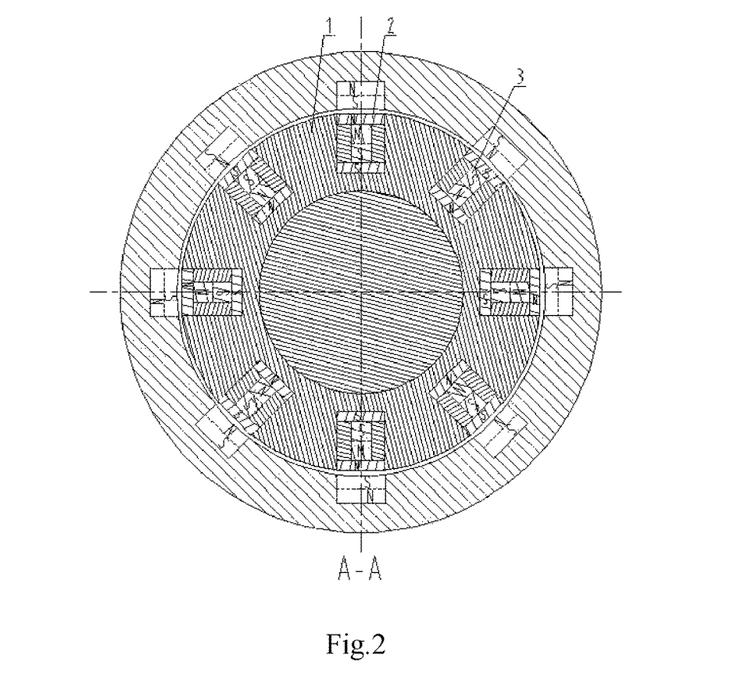
FIG. 2 is the A-A section view of FIG. 1.
Figure 3:
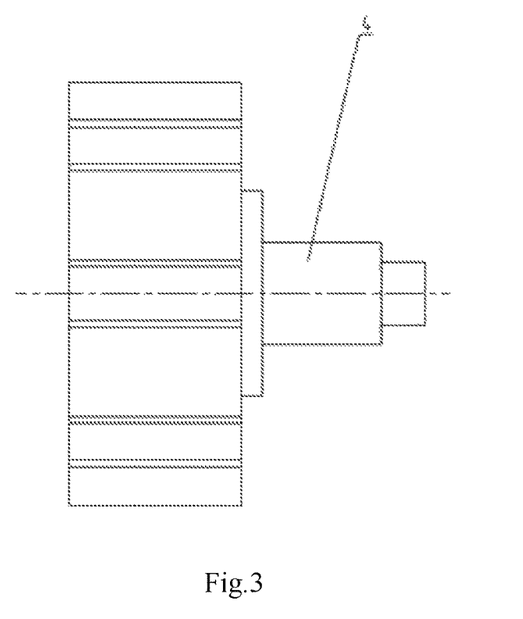
FIG. 3 is the front view of inner magnetic rotor of Embodiment 1.
Figure 4:
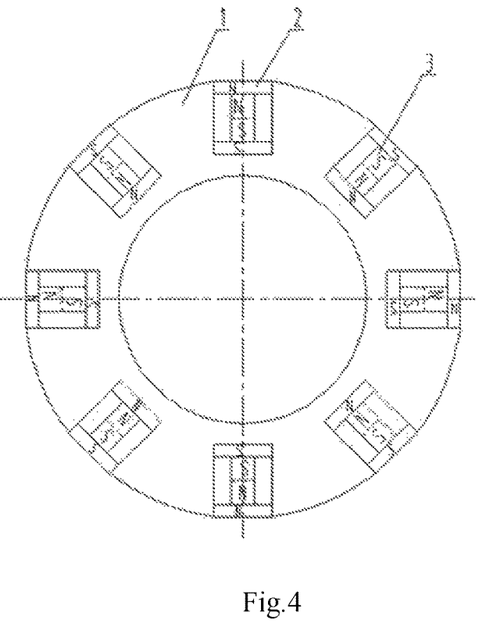
FIG. 4 is the left view of FIG. 3.
Figure 5:
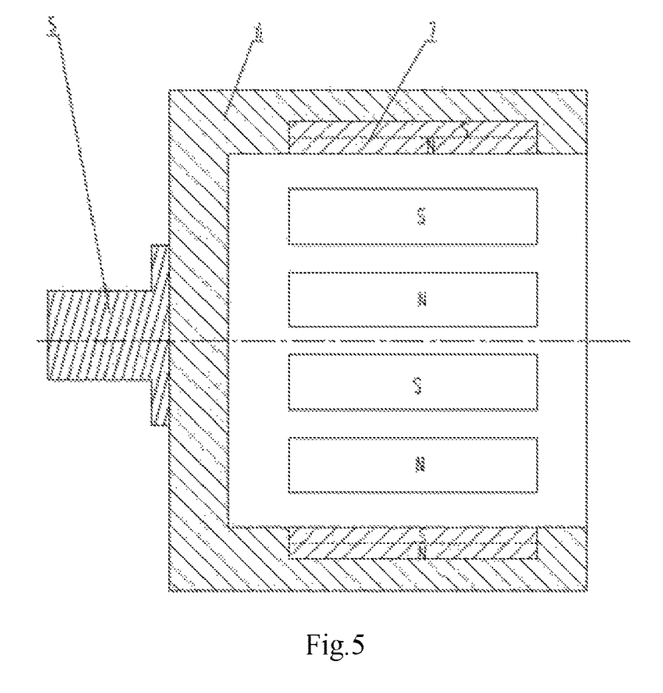
FIG. 5 is the front section view of outer magnetic rotor of Embodiment 1.
Figure 6:
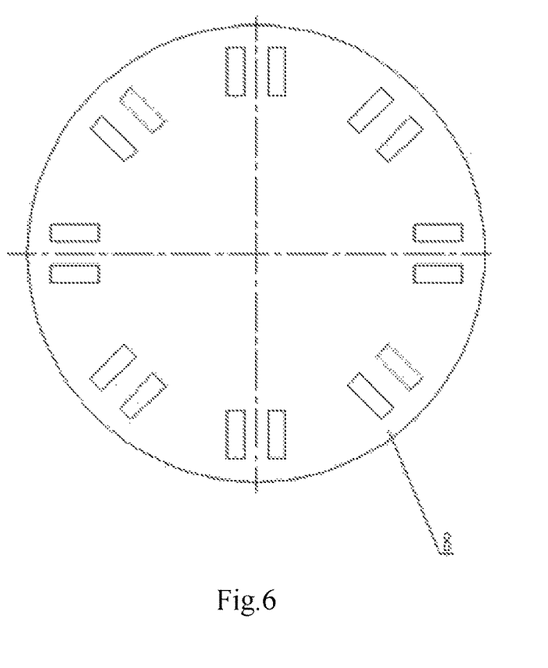
FIG. 6 is the schematic diagram of distribution of magnetically conductive body of Embodiment 1.
Figure 7:
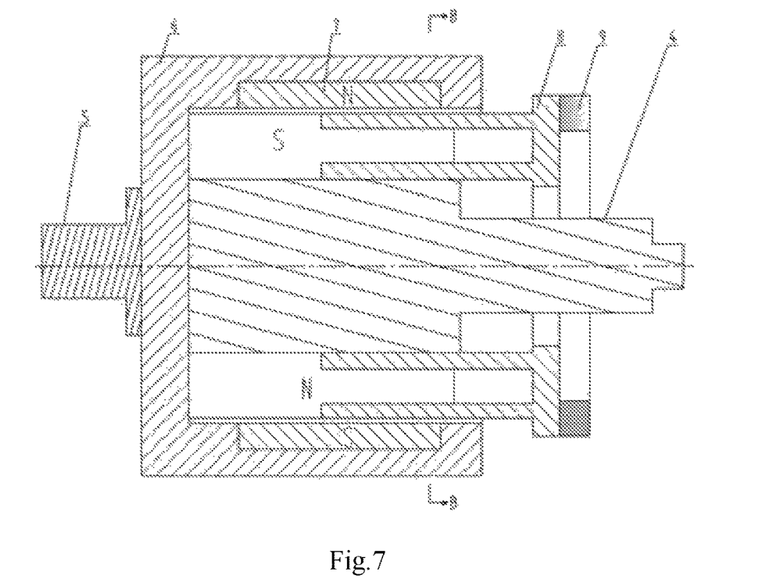
FIG. 7 is the front section view of Embodiment 2.
Figure 8:
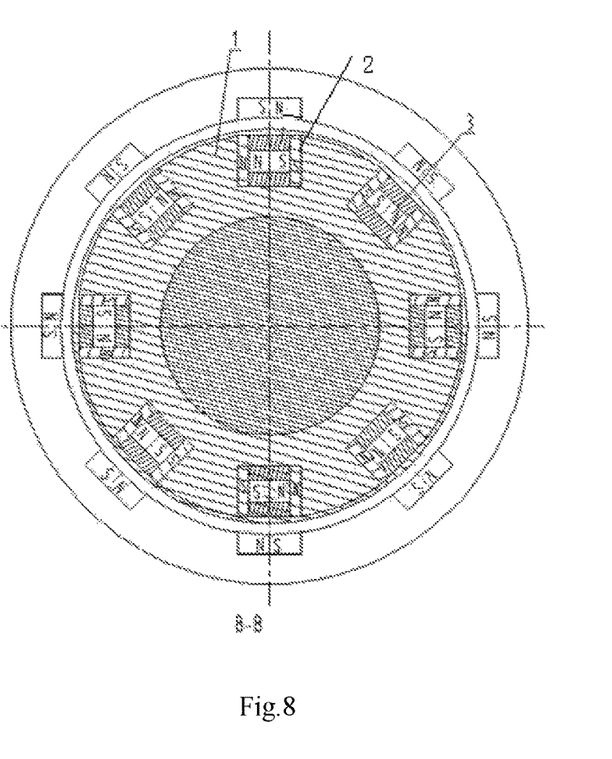
FIG. 8 is the B-B section view of FIG. 7.
Figure 9:
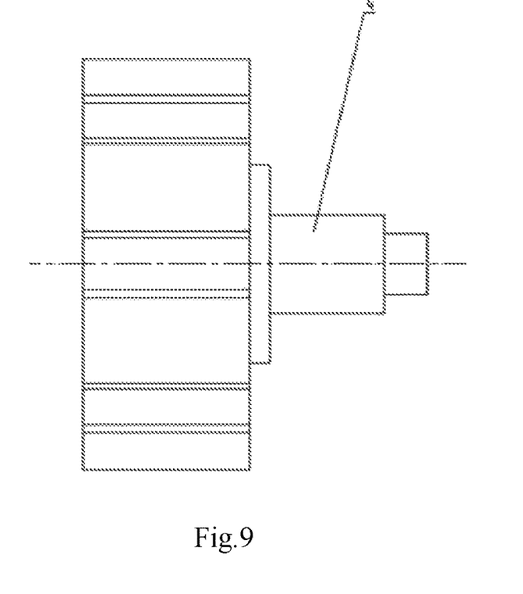
FIG. 9 is the front view of inner magnetic rotor of Embodiment 2.
Figure 10:
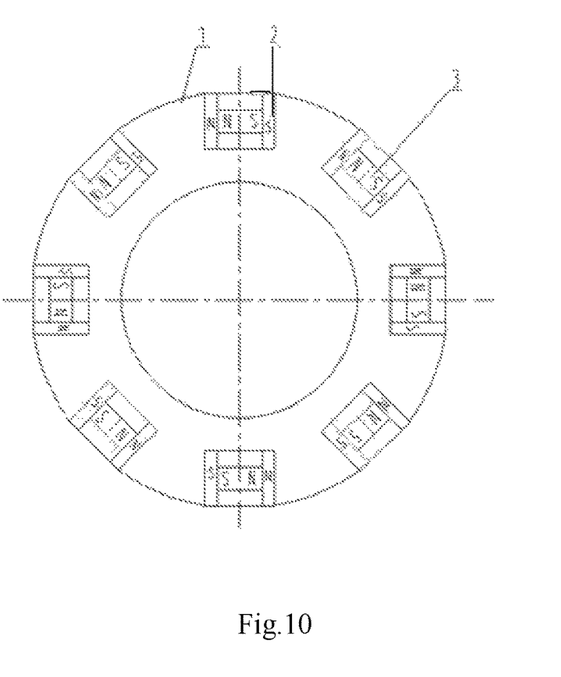
FIG. 10 is the left view of FIG. 9.
Figure 11:
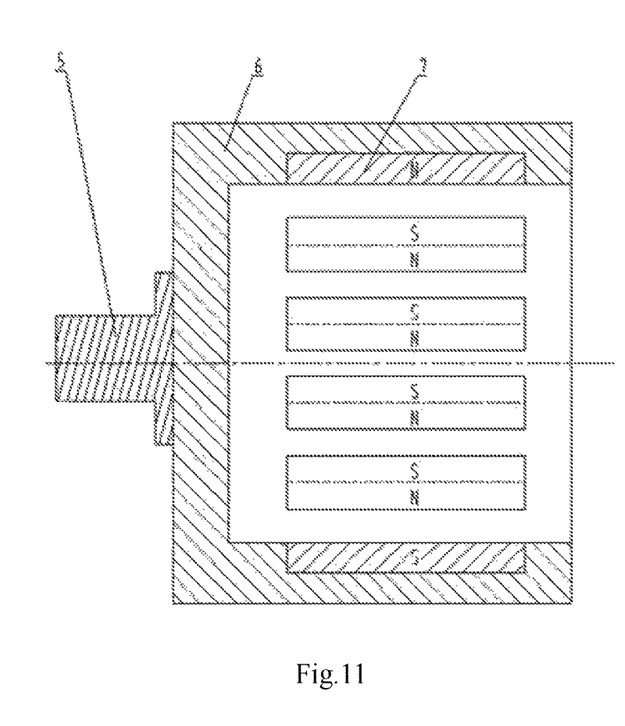
FIG. 11 is the front section view of outer magnetic rotor of Embodiment 2.
Figure 12:
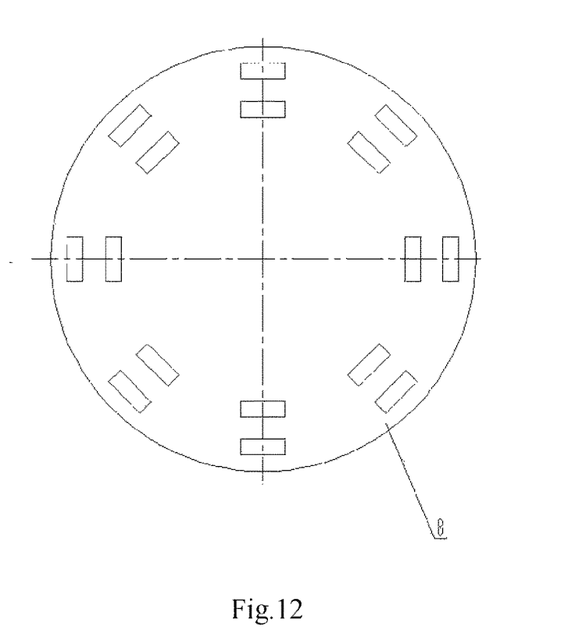
FIG. 12 is the schematic diagram of distribution of magnetically conductive body of Embodiment 2.
Figure 13:
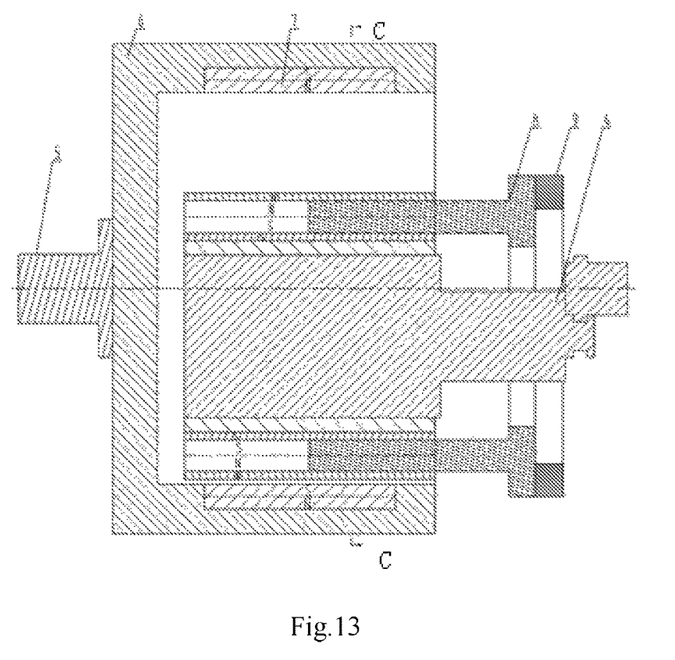
FIG. 13 is the front section view of Embodiment 3.
Figure 14:
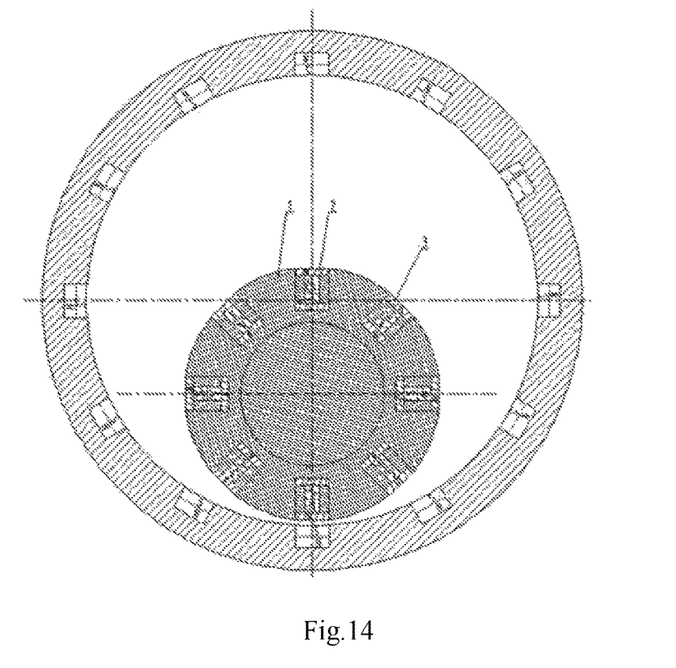
FIG. 14 is the C-C section view of FIG. 13.

A permanent magnet speed governor having fixed magnetic gap, wherein the number of outer permanent magnets 7 in the Embodiment is different from the number of inner permanent magnets 3, while other structures are the same as those of Embodiment 1.

Embodiment 4

Figure 15:
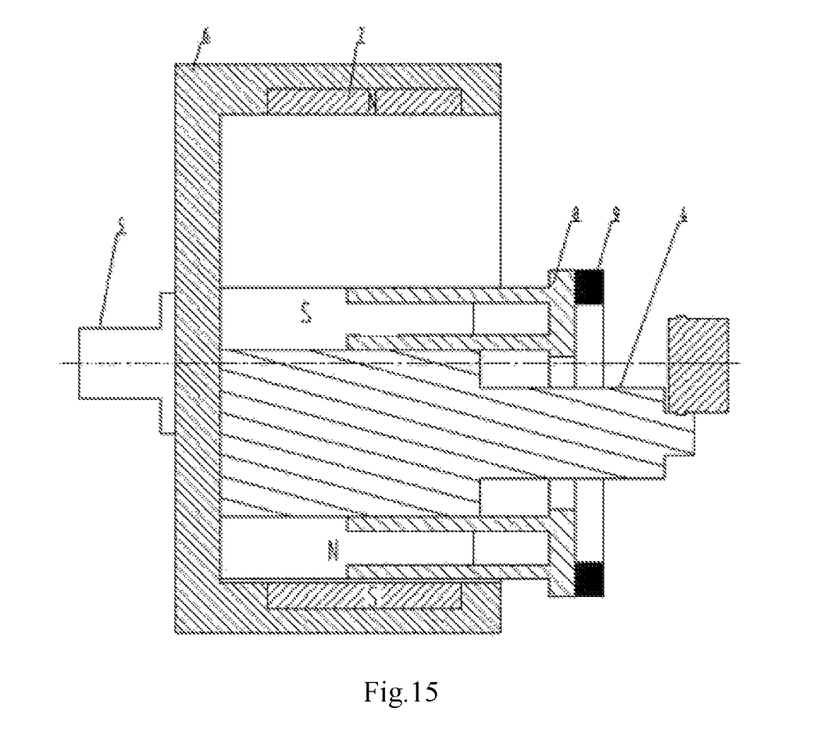
FIG. 15 is the front section view of Embodiment 4.

A permanent magnet speed governor having fixed magnetic gap, wherein the number of outer permanent magnets 7 in the Embodiment is different from the number of inner permanent magnets 3, while other structures are the same as those of Embodiment 2.

It should be finally illustrated that: the aforesaid embodiments are only used to illustrate the technical solutions of the present invention, but not to restrict it. Although detailed illustrations for the present invention have been made based on aforesaid embodiments, common technical staff of corresponding fields should understand that they can still conduct revision or equivalent substitution for concrete embodiments of the present invention, and any revision or equivalent substitution not breaking away from the spirit and scope of the present invention should all be contained amid the claiming scope of the present invention.

The invention claimed is:

1. A permanent magnet speed governor having fixed magnetic gap, comprising an outer magnetic rotor connected to a drive shaft and an inner magnetic rotor connected to a driven shaft, at least one outer permanent magnet being evenly distributed along the circumferential direction of the inner circumferential surface of the said outer magnetic rotor, and the end face of magnet of each outer permanent magnet is perpendicular to the end face of the outer magnetic rotor; at least one inner permanent magnet being evenly distributed along the circumferential direction of the outer circumferential surface of the said inner magnetic rotor, and the end face of magnet of each inner permanent magnet is perpendicular to the end face of inner magnetic rotor, two magnetic pole sides of the inner permanent magnet being respectively fixed to an iron yoke, another two sides each being provided with a magnetically conductive body, the magnetically conductive body is placed in the middle of two iron yokes, used for constituting a closed magnetic circuit surrounding the inner permanent magnet through matching with iron yoke, one end of the inner magnetic rotor being provided with a magnetic circuit regulator used for moving each magnetically conductive body along the axial direction.

2. The permanent magnet speed governor having a fixed magnetic gap according to claim 1, wherein the magnetic poles of the said outer permanent magnet and the inner permanent magnet are arranged along the radial direction, and the magnetisms of exposed magnetic pole surfaces of two adjacent outer permanent magnets or two adjacent inner permanent magnets being different.

3. The permanent magnet speed governor having a fixed magnetic gap according to claim 1, wherein the magnetic poles of the said outer permanent magnet and the inner permanent magnet are arranged along the circumferential direction, and the magnetisms of exposed magnetic pole surfaces of neighboring sides of two adjacent outer permanent magnets or two adjacent inner permanent magnets being different.

4. The permanent magnet speed governor having a fixed magnetic gap according to claim 1, wherein the said magnetic circuit regulator comprises a regulating actuator used for receiving control signals to control the movement of magnetically conductive body.

5. The permanent magnet speed governor having a fixed magnetic gap according to claim 4, wherein the said regulating actuator can be electric actuator, pneumatic actuator or hydraulic actuator.

6. The permanent magnet speed governor having a fixed magnetic gap according to claim 2, wherein the said magnetic circuit regulator comprises a regulating actuator used for receiving control signals to control the movement of magnetically conductive body.

7. The permanent magnet speed governor having a fixed magnetic gap according to claim 3, wherein the said magnetic circuit regulator comprises a regulating actuator used for receiving control signals to control the movement of magnetically conductive body.

8. The permanent magnet speed governor having a fixed magnetic gap according to claim 6, wherein the said regulating actuator can be electric actuator, pneumatic actuator or hydraulic actuator.

9. The permanent magnet speed governor having a fixed magnetic gap according to claim 7, wherein the said regulating actuator can be electric actuator, pneumatic actuator or hydraulic actuator.

* * * * *